United States Patent
Nakamoto et al.

(10) Patent No.: US 7,611,082 B2
(45) Date of Patent: Nov. 3, 2009

(54) METHOD FOR THE PRODUCTION OF POWDER WITH HIGH TANNIN CONTENT AND ITS USE

(75) Inventors: Yusho Nakamoto, Hatsukaichi (JP); Toshihiko Tsunoda, Hatsukaichi (JP); Keiko Ono, Saeki-ku (JP); Hiroyuki Yano, Uji (JP); Yoshikazu Yazaki, Moorabbin (AU); Huijian Jiang, Clayton (AU); Frank Lawson, Mitcham (AU); Peter Heinz Theodore Uhlherr, Mt. Waverley (AU)

(73) Assignees: Kabushiki Kaisha Wood One, Hatsukaichi-Shi (JP); Monash University, Clayton (AU)

( * ) Notice: Subject to any disclaimer, the term of this patent is extended or adjusted under 35 U.S.C. 154(b) by 0 days.

(21) Appl. No.: 11/700,185

(22) Filed: Jan. 31, 2007

(65) Prior Publication Data

US 2007/0125890 A1 Jun. 7, 2007

Related U.S. Application Data

(63) Continuation of application No. 10/377,888, filed on Mar. 4, 2003, now abandoned.

(30) Foreign Application Priority Data

Mar. 8, 2002 (JP) ............................. 2002-064178

(51) Int. Cl.
*B02C 17/02* (2006.01)
*B02C 7/00* (2006.01)
(52) U.S. Cl. ...................................... 241/24.29; 241/27
(58) Field of Classification Search ................... 241/27, 241/24.1, 24.29; 527/400
See application file for complete search history.

(56) References Cited

U.S. PATENT DOCUMENTS

| 2,510,119 A | 6/1950 | Lathrop |
| 2,563,086 A | 8/1951 | Verschoor |
| 4,113,919 A | 9/1978 | Hartman |

FOREIGN PATENT DOCUMENTS

| EP | 1 245 613 A2 | 10/2002 |
| JP | A 2002-302497 | 10/2002 |
| WO | WO 98/37148 | 8/1998 |

*Primary Examiner*—Bena Miller
(74) *Attorney, Agent, or Firm*—Oliff & Berridge, PLC

(57) ABSTRACT

A method of producing powder with a high tannin content includes pulverizing a tannin-containing plant such as bark of radiata pine (*Pinus radiata*) and classifying the pulverized material into fine particles having a desired particle size, for example, fine particles having a particle diameter of 100 to 1,000 μm or less. A powder with a high tannin content is produced by such a method. The thus obtained powder with a high tannin content exhibits excellent characteristics when used as an adhesive, a binder, etc. for wood materials.

6 Claims, No Drawings

METHOD FOR THE PRODUCTION OF POWDER WITH HIGH TANNIN CONTENT AND ITS USE

This is a Continuation of Application Ser. No. 10/377,888 filed Mar. 4, 2003. The entire disclosure of the prior application is hereby incorporated by reference herein in its entirety.

BACKGROUND OF THE INVENTION

1. Field of the Invention

The present invention relates to a method for the production of powder with high tannin content, powder with high tannin content obtained by the same method, and a use thereof. More specifically, the present invention relates to a method for the production of powder with high tannin content in an adhesive or a binder for wood as a main component, molding, a binder for molding, a filler an enhancer, a healthcare food and a drug.

2. Description of the Related Art

Various components are widely present in plants. It is known that extraction of such components with solvents such as water, aqueous solvents and lower alcohols can give rise to a substance usually called tannin that can be used as an adhesive, a binder, a drug or the like.

In the case where tannin is used as a raw material of adhesives, binders or moldings, plant resources with much tannin contents, for example, bark or wood of mangrove, acacia, radiata pine (*Pinus radiata*), pine, larch, quebracho, eucalyptus, oak, or Japanese hemlock are crushed to a suitable particle size. Then, tannin is extracted therefrom with water, an aqueous solvent or organic solvent such as a lower alcohol and filtered. The tannin filtrate is concentrated and then used as high concentration tannin solutions or it is dried and then used as powdered tannin.

To efficiently extract tannin, it is advantageous to crush plant resources into particles as small as possible so that an extraction solvent can sufficiently and speedily penetrate into the substances to be extracted, i.e., the plant resources. Although the particle size distribution of plant resources after crushing may be different depending on the kind of plant resource, such as bark, it has been known that a filter having a pore diameter of 20 to 60 μm is suitable for the filtration of tannin solutions in a filtration step after the extraction. However, use of such a filter could in some cases result in formation of a large amount of fine powder that is so fine as to cause the problem of clogging of the filter, so that efficient filtration cannot be performed.

Conventionally, the extraction has been performed after removing the fine particles obtained after the pulverization. However, mere removal of the fine particles not only results in a great loss of raw material but also raises a problem of causing environmental pollution when they are discarded.

SUMMARY OF THE INVENTION

A basic objective of the present invention is to effectively utilize such a fine particle fraction obtained after crushing of a plant resource.

Therefore, an objective of the present invention is to provide a method for production of powder with a high tannin content, which is free of the above-mentioned problems.

Another objective of the present invention is to provide powder with a high tannin content produced by such a method.

Still another objective of the present invention is to provide a method of using such powder.

Under the circumstances, the inventors of the present invention have made extensive studies with a view to effective utilization of the above-mentioned fine particles formed when a plant resource is crushed into particles having a particle size suitable for the extraction of tannin which is conventionally performed. That is, the inventors extracted the fine particles with methanol by a conventional method to obtain tannin and then examined the Stiasny values of the obtained tannin (ratio of tannin contained in the extract that reacts with aldehyde). As a result, it was revealed that the methanol extract was obtained from the fine particles at high yields and the Stiasny value of tannin thereof was very high.

Accordingly, the inventors prepared a liquid from the powder fraction of the pulverized and classified fine particles without extraction as a main component of an adhesive and performed adhesive tests, the results of which revealed that the liquid had an adhesive strength identical to or higher than that of the conventional tannin adhesive.

Further, the inventors have confirmed that adhesives prepared by adding the powder fraction of the mechanically crushed and classified fine particles to conventional tannin as a filler or adhesive enhancer also have an adhesive strength identical to or higher than that of conventional tannin adhesives.

Similarly, also in the case of adhesives composed of a synthetic phenol resin adhesive and the above-mentioned powder fraction added thereto as a filler or adhesive enhancer, improvements in adhesive strength and water resistance have been observed.

Therefore, the present invention provides a method for production of powder with a high tannin content, comprising crushing a tannin-containing plant resource and classifying the pulverized plant resource.

The present invention also provides powder with a high tannin content obtained by the above-mentioned production method.

Furthermore, the present invention provides a method of using the powder with a high tannin content as a substitute for tannin.

DESCRIPTION OF THE PREFERRED EMBODIMENTS

The present invention can be applied to various plant resources with tannin without any particular limitations. Therefore, preferred plant resources are those plants conventionally used for the extraction of tannin. Furthermore, to obtain a fine powder fraction having characteristics that can be utilized for adhesives, binders, moldings, etc., bark and wood of mangrove, acacia, radiata pine (*Pinus radiata*), pine, larch, eucalyptus, oak, hemlock, quebracho, and the like are desirable. In particular, the bark thereof is preferable from the viewpoint of utilization of resources and availability of powder with high tannin content.

In crushing of plant resources, in a case of plant resources with high tannin contents, e.g., forest resources, bark, etc. are crushed as they are or after adjustment to a suitable moisture content, into a particle size of 1 mm or less or formed into a fiber by a hammer mill, a Wiley mill, a ball mill, a roller mill or a high speed rotary grinder and used.

The method for crushing is not particularly limited; however, crushing may be performed preferably by a method in which no high temperature is reached at the time of crushing, and for a short time.

The plant resources crushed to a size of 1 mm or less is fed to a classifier and classified into fine particle powder having a particle size of 10 to 1000 μm, preferably not greater than 100

μm, and more preferably 50 to 80 μm or less by a screen classifier such as a rotary drum screen or a sieve shaker, or a dry classifier based on, for example, gravitational classification, inertial classification or centrifugal classification.

The method of classification is not particularly limited but is advantageously performed for a short time and by a method in which no high temperature is reached at the time of classification, mainly based on mechanical classification of particle size.

Furthermore, since the particle size of fractions of particles with high tannin content may vary depending on the kind of plant resource and configuration of particles after crushing, the particle size for the classification is not particularly limited. The particle size of fine powder that is used as it is for adhesives, binders, moldings, etc. is preferably 100 μm or less, more preferably 60 to 70 μm or less. Those fractions with a particle size of 100 to 1000 μm may be recycled to be used in the step of tannin extraction.

The particles after classification may further be crushed depending on the purpose for which they are subsequently used.

The tannin content (Stiasny value) of the extractives which is extracted with methanol from the fine powder with high tannin content obtained by the present invention, which reacts with aldehyde is 80% or more (preferably 90% or more), to 106.8% which is a theoretical value of a reaction product with aldehyde in case where the tannin is 100% catechine as a standard (weight percentage: this applies to rest of the specification).

A mixed solution of the fine powder with high tannin content and an aqueous solution as an adhesive and a binder desirably has a viscosity of 6000 mPa·s or less which is suitable for coating in an extruder or a flow coater of a coating apparatus. A mixed solution with a solids content of 35 to 45% produces with an adhesion strength equal to that of phenol resin. An adhesive, which is prepared from the fine powder with high tannin content obtained by the present invention, has good processing properties as well as good coating properties. Such an adhesive has high adhesion strength to wood test pieces, and wood failure is also observed. Furthermore, the fine powder with high tannin content obtained by the present invention may be added to tannin adhesives and other resins, for example, synthetic formaldehyde resin. They can be mixed at a ratio in the range of (tannin or synthetic resin):(powder with high tannin content)=1:99 to 99:1.

The reason that the fine particles obtained by the method of the present invention have high tannin content has not been elucidated in detail yet. Presumably, the portion of a plant resource containing a significant amount of tannin is more easily crushed than the other portions thereof. Therefore, fine particles portion generated upon crushing into a size suitable for filtration after extraction in a conventional tannin extraction operation may be used. Alternatively, as in the case of outer bark of radiata pine (*Pinus radiata*), the content of tannin may be measured in advance and only the portions of the bark that are known to have high tannin contents may be crushed and used.

The powder with high tannin content obtained by the production method of the present invention can be used in various materials such as an adhesive, a binder, molding, a binder for molding, a filler, an enhancer, a health-care food, and a drug either singly or as an enhancer or filler to the conventional tannin powder or high concentration tannin solution.

EXAMPLES

Hereinafter, the present invention will be described by way of illustrative examples. It should be noted that the present invention is not limited thereto. Particularly, here, bark of radiata pine (*Pinus radiata*) and of acacia (*Acacia mangium*) is divided into outer and inner bark and experiments on the outer bark, which contains more tannin than the inner bark, will be explained. However, the bark can be crushed directly without dividing into outer bark and inner bark and then classified into a predetermined particle size to obtain bark as a fine powder with high tannin content. In the following examples, unless otherwise specified, "%" and "parts" denote "% by weight" and "parts by weight".

Example 1

As a plant resource containing tannin, radiata pine (*Pinus radiata*) bark discarded and discharged in large amounts in the step of processing wood was used. The bark was separated into the outer bark that is corky and has higher tannin content and the inner bark that is fibrous and has lower tannin content by the method described in Japanese Patent Application Laid-open No. 2002-302497. The separated outer bark of radiata pine (*Pinus radiata*) was dried to have a moisture content of 20% or less and then crushed in a hammer mill so as to pass through a 1.6 mm mesh screen. The outer bark powder pulverized to a particle size of 1.6 mm or less was classified into eight particle size fractions in a sieve shaker (Fisher-Wheeler Sieve Shaker) provided with seven sieves (Endecotts BS410) of 38, 45, 53, 63, 75, 90 and 106 μm mesh openings, respectively.

The eight particle size fractions obtained by use of the above-mentioned seven types of sieves were each extracted with methanol for 15 minutes to obtain tannin/methanol solutions. Methanol was evaporated from the tannin/methanol solutions to obtain concentrated tannin solutions, which then were subjected to freeze drying to obtain tannin powder. Table 1 shows the yield of extractives by such methanol extraction (tannin powder), with respect to the total dry weight of the bark, and the Stiasny value of tannin thereof. As can be seen from Table 1, the fractions of high classification yields were fractions with a particle size of not smaller than 106 μm and of 53 to 63 μm and, furthermore, fractions having high methanol extract yields were fractions with a particle size of not greater than 63 μm. The fraction having the highest Stiasny value of tannin was the outer bark powder fraction with a particle size of 53 to 63 μm. The fine powder with a particle size of not greater than 63 μm causes clogging when filtration is performed through a filter with a pore size of 20 to 60 μm in the conventional tannin extraction.

TABLE 1

Particle size distribution, extractive yield and Stiasny values of the powder from radiata pine (*Pinus radiate*) outer bark

| Particle size (μm) | Classification yield (%) | Extract Yield (%) | Stiasny values* (%) |
|---|---|---|---|
| >106 | 36.6 | 38.9 | 95.33 |
| 90–106 | 7.0 | 36.8 | 91.62 |
| 75–90 | 4.7 | 37.3 | 91.18 |

TABLE 1-continued

Particle size distribution, extractive yield and Stiasny values
of the powder from radiata pine (*Pinus radiate*) outer bark

| Particle size (μm) | Classification yield (%) | Extractives Extract Yield (%) | Stiasny values* (%) |
|---|---|---|---|
| 63–75 | 16.9 | 44.1 | 98.31 |
| 53–63 | 34.8 | 69.5 | 103.4 |
| 45–53 | 0.22 | 68.7 | — |
| 38–45 | 0.04 | — | — |
| <38 | 0.005 | — | — |

*Stiansy value of 106.8% for 100% catechin

Water was added to prepare slurry such that the obtained resin powder with a particle size of 53 to 63 μm occupies a solid content of 40% of the resulting mixture. Then, 0.5 part of sodium hydroxide and 10 parts of paraformaldehyde were mixed with respect to 100 parts of the outer bark powder with the slurry to prepare an adhesive (radiata pine (*Pinus radiata*) outer bark powder adhesive). Mixing examples and liquid viscosity of the adhesives are shown in Table 2.

On the other hand, the outer bark powder having a particle size greater than 63 μm was extracted with methanol to obtain a tannin/methanol solution, from which methanol was then evaporated, followed by subjecting the residue to freeze drying to obtain tannin powder. Similarly, by using the obtained tannin powder, a tannin adhesive (radiata pine (*Pinus radiata*) outer bark tannin adhesive) based on the formulation shown in Table 2 was obtained.

As can be seen from Table 2, it is revealed that the adhesive containing the outer bark powder with a particle size of 53 to 63 μm had a viscosity identical with that of the conventional tannin adhesive, even without adding fillers such as coconut shell flour, wheat flour, and macadamia nuts shell flour. This viscosity was within the range of 500 to 6,000 mPa·s, which is suitable for a coating apparatus such as an extruder or a flow coater.

TABLE 2

An adhesive formulation from Radiata pine (*Pinus radiata*) outer bark

| Formulation | The outer bark powder adhesive | The outer bark tannin adhesive |
|---|---|---|
| Outer bark powder (53–63 μm) | 100 parts | 0 part |
| Extract | 0 part | 100 parts |
| Sodium hydroxide | 0.5 part | 0.5 part |
| Paraformaldehyde | 10 parts | 10 parts |
| Coconut shell flour | 0 part | 0 part |
| Wheat flour | 0 part | 0 part |
| Macadamia Nuts shell flour | 0 part | 10 parts |
| Water | 150 parts | 150 parts |
| Solids content in an adhesive liquid | 30–40 (%) | 30–40 (%) |
| Viscosity (mPa · s, 25° C.) | 1000–6000 | 1000–6000 |

The normal state and boiling adhesion test results of each adhesive formulated according to Table 2 are shown in Table 3. Table 3 also shows the results of the same tests on a commercially available phenol resin adhesive. As can be seen from Table 3, in the normal state and under boiling conditions, the adhesives of the present invention exhibited an adhesive strength and wood failure which are both identical with or higher than those of the conventional tannin adhesive or phenol resin adhesive.

The adhesion strength test was conducted in accordance with Japanese Agricultural Standard (JAS). Veneers of radiata pine (*Pinus radiata*) were used as test pieces (specimen). Each veneer was coated with an adhesive in an amount of 150 to 200 g/m$^2$, and pressed under a cold pressure of 0.8 MPa for 5 minutes and under a hot pressure of 1.0 MPa at 140° C. for 7 minutes to be bonded to each other. The adhesion strength test was conducted with respect to 10 test pieces in dry strength (in which the test pieces were as initially produced) and 10 test pieces after boiling in water for 72 hours. Table 3 shows average results.

In each column of the adhesive test in Table 3, the numerical values in the upper rows indicate adhesive strength (kgf/cm$^2$) and the numerical values in the brackets in the lower rows indicate wood failure (%) (the same applies to the subsequent tables).

TABLE 3

Bark/formaldehyde adhesive using radiata pine (*Pinus radiata*) outer bark

| Test veneer | Test conditions | Adhesion test (kgf/cm$^2$) (Wood failure (%)) | | |
|---|---|---|---|---|
| | | Radiata pine (*Pinus radiata*) outer bark powder adhesive | Radiata pine (*Pinus radiata*) outer bark tannin adhesive | Phenol Resin adhesive |
| Radiata pine (*Pinus radiata*) | Normal state | 19 (80) | 17 (90) | 15 (90) |
| | Boiling | 10 (60) | 12 (70) | 10 (60) |
| Kapur | Normal state | 21 (80) | 25 (80) | 23 (75) |
| | Boiling | 16 (60) | 17 (60) | 15 (60) |

Example 2

The fraction with high tannin content, 53–63 μm powder, of radiata pine (*Pinus radiata*) outer bark obtained in Example 1 was mixed with tannin powder obtained by methanol extraction of the bark or with commercially available phenol resin to prepare adhesives and their adhesive strength was examined. Table 4 shows mixing examples of adhesives and viscosity after mixing with adhesive liquid at a solids content of 40%.

As can be seen from Table 4, the adhesive liquid with the outer bark powder showed coatable viscosity.

Furthermore, the normal state and boiling adhesion test results of each adhesive formulated according to Table 4 are shown in Table 5. As can be seen from Table 5, in the normal state and under boiling conditions, the adhesives of the present invention exhibited an adhesive strength and wood failure which are both identical with or higher than those of the conventional tannin adhesive or phenol resin adhesive.

TABLE 4

Mixing samples of a bark adhesives using
Radiata Pine (*Pinus radiata*) outer bark

| Formulation | Mixing example 1 | Mixing example 2 | Mixing example 3 |
|---|---|---|---|
| Outer bark powder (53–63 μm) | 50 parts | 50 parts | 70 parts |
| Extract | 50 parts | 0 part | 30 parts |
| Commercially available phenol resin | 0 part | 50 parts | 0 part |
| Sodium hydroxide | 0.5 parts | 0.5 parts | 0.5 parts |
| Paraformaldehyde | 10.0 parts | 10.0 parts | 10.0 parts |
| Coconut shell flour | 0 part | 0 part | 0 part |
| Wheat flour | 0 part | 0 part | 0 part |
| Macadamia nuts shell flour | 0 part | 0 part | 0 |
| Water | 150 parts | 150 parts | 150 parts |
| Solids content in an adhesive liquid | 30–40 (%) | 30–40 (%) | 30–40 (%) |
| Viscosity (mPa·s, 25° C.) | 2000–6000 | 2000–6000 | 3000–6000 |

TABLE 5

Radiata pine (*Pinus radiata*) outer bark/ and bark extract/
formaldehyde adhesives

| Test veneer | Test conditions | Adhesion test: (kgf/cm$^2$) (Wood failure (%)) | | |
|---|---|---|---|---|
| | | Mixing example 1 | Mixing example 2 | Mixing Example 3 |
| Radiata pine (*Pinus radiata*) | Normal state | 18 (80) | 20 (80) | 20 (70) |
| | Boiling | 10 (60) | 12 (60) | 11 (70) |
| Kapur | Normal state | 21 (80) | 25 (90) | 22 (80) |
| | Boiling | 13 (60) | 12 (70) | 14 (70) |

Example 3

*Acacia mangium* bark was used as a plant resource. The bark was separated into outer bark having a high tannin content and inner bark having a low tannin content. The separated *Acacia mangium* outer bark was dried at 40° C. so as to have a moisture content of 10 to 15% and then crushed in a Wiley mill by use of a 0.5 mm mesh screen. The thus obtained crushed *Acacia mangium* outer bark powder was charged to a sieve shaker (Fisher Wheeler Sieve Shaker) provided with four sieves of 63, 125, 250 and 500 μm mesh opening, and classified for a suitable time.

Five particle size fractions obtained by use of the four kinds of sieves were each extracted with methanol on a warm bath at 30° C. for 1 hour to obtain tannin/methanol-extracted solutions. After evaporation of methanol and addition of a small amount of water, the extracted solutions were subjected to freeze drying to obtain tannin powders. Table 6 shows yields and Stiasny values of the extracts (tannin powders) obtained by extraction with methanol, based on the dry weight of total bark.

As can be seen from Table 6, the bark particle size fraction with a particle size of not greater than 63 μm, which could cause clogging when filtration is performed through a filter with a pore size of 20 to 60 μm in the conventional tannin extraction, had a high yield and a high Stiasny value of tannin when extracted with methanol.

TABLE 6

Particle size of outer bark powder, extractive yield
and Stiasny value from *Acacia mangium*

| Particle size (μm) | Classification yield (%) | Extract Yield (%) | Stiasny value (%) |
|---|---|---|---|
| 250–500 | 28.3 | 32.6 | 88.0 |
| 125–250 | 24.7 | 32.5 | 94.4 |
| 63–125 | 17.7 | 29.2 | 96.5 |
| <63 | 29.3 | 49.4–55.1 | 97.5 |

Furthermore, a slurry was prepared such that the obtained resin powder with a particle size of not greater than 63 μm occupies a solid content of 40% of the resulting mixture. Then, 0.9 part of sodium hydroxide and 10 parts of paraformaldehyde were mixed with respect to 100 parts of the outer bark powder with the slurry to prepare an adhesive. Table 7 shows mixing examples and paste viscosities of the adhesives.

With respect to outer bark powder having a size of greater than 63 μm, extraction with methanol was performed to obtain a tannin/methanol extracted solution, from which methanol was then evaporated, followed by adding a small amount of water thereto and then subjecting the residue to freeze drying to obtain tannin powder. Similarly, by using the tannin powder, a tannin adhesive based on the formulation shown in Table 7 was obtained.

As can be seen from Table 7, it was revealed that an adhesive containing the outer bark powder having a particle size of not greater than 63 μm had a viscosity identical with that of the conventional tannin adhesive, even without adding fillers such as coconut shell flour and wheat flour. This viscosity was within the range of 500 to 6,000 mPa·s, which is suitable for a coating apparatus such as an extruder or a flow coater.

TABLE 7

The outer bark adhesive formulation from *Acacia mangium*

| Formulation | *Acacia mangium* outer bark powder adhesive | *Acacia mangium* outer bark tannin adhesive |
|---|---|---|
| Outer bark powder (<63 μm) | 100 parts | 0 part |
| Extract | 0 part | 100 parts |
| Sodium hydroxide | 0.9 part | 0.9 part |
| Paraformaldehyde | 10 parts | 10 parts |
| Coconut shell flour | 0 part | 0 part |
| Wheat flour | 0 part | 0 part |
| Macadamia nuts shell flour | 0 part | 10 parts |
| Water | 140 parts | 140 parts |
| Solids content in an adhesive liquid | 30–40 (%) | 30–40 (%) |
| Viscosity (mPa·s, 25° C.) | 3000–6000 | 4000–6000 |

The normal state and hot water and boiling adhesive test results of each adhesive formulated according to Table 7 are shown in Table 8. The adhesive tests were performed according to JIS K-6851. As can be seen from Table 8, in the normal state and under hot water and boiling conditions, the adhesives of the present invention exhibited an adhesive strength and wood failure which are both identical with or higher than those of the conventional acacia tannin adhesive or phenol resin adhesive.

TABLE 8

Acacia mangium outer bark/ and outer bark extract/ formaldehyde adhesives

| Test veneer | Test conditions | Adhesion test (kgf/cm²) | |
|---|---|---|---|
| | | Acacia mangium outer bark powder adhesive | Acacia tannin adhesive |
| Red meranti | Normal state | 15.4 | 12.0 |
| | Hot water | 12.4 | 6.8 |
| | Boiling | 11.7 | 7.1 |

Example 4

Acacia mangium barks were used as a plant resource. The bark was separated into outer bark having a high tannin content and inner bark having a low tannin content. The separated Acacia mangium outer bark was dried at 40° C. so as to have a moisture content of 10 to 15% and then crushed in a Wiley mill by use of a 0.5 mm mesh screen. Out of the thus crushed Acacia mangium outer bark powders, those which passed through a sieve of 63 μm mesh were used to produce moldings. More particularly, 0.5 g of paraformaldehyde was added to 5 g of the Acacia mangium powder and was well mixed. Then, the mixture was charged in a cylindrical mold having a diameter of 50 mm and pressed at a pressing pressure of 100 MPa and at a temperature of 160° C. for 30 minutes to obtain moldings of about 2 mm in thickness. The density of the obtained moldings was about 1.4 g/cm³.

A sample having a width of 10 mm and a length of 40 mm was prepared from the moldings and the flexural strength of it was determined by a centrally concentrated load method. Young's modulus in flexure and flexural strength of the sample were 4 to 5 GPa and 40 to 50 MPa, respectively. The flexural strength increased by 30 to 40% by addition of 30% of wood flour (particle diameter: 63 μm or less) to the outer bark powder. Water absorbing rate and thickness swelling rate of the outer bark powder moldings after 1 hour's boiling were 3 to 4% and 4 to 5%, respectively. The water resistance value of the sample was substantially identical with that of novolak type phenol resin moldings containing 50% of wood flour prepared as a comparison. Thus, it was revealed that the molded product from Acacia mangium outer bark powder has excellent water resistance.

Example 5

Formaldehyde catching effect was measured.
The radiata pine (Pinus radiata) outer bark powder (particle size: 53 to 63 μm) of the present invention or conventional macadamia nuts shell flour was added as an additive to a commercially available phenol resin adhesive to prepare an adhesive paste. By using this adhesive paste, radiata pine (Pinus radiata) veneers each having a thickness of 4.0 mm were laminated to make a 5-ply plywood laminate. Mixing conditions of the adhesive are shown in Table 9.

For each sample board cut out from the thus made plywood laminate, the formaldehyde exhalation amount thereof was measured according to JAS and compared. As a result, it was revealed that the sample board made by laminating the veneers (developed product) with the adhesive containing the radiata pine (Pinus radiata) outer bark powder had a very small formaldehyde exhalation amount, which easily satisfied FCO (0.5 mg/l) or less according to the prescription by JAS.

The results of measurement of each test board are shown in Table 9. In Table 9, the conventional product indicates a plywood laminate laminated with an adhesive containing macadamia nuts shell flour.

TABLE 9

| | Developed product | Conventional product |
|---|---|---|
| Commercially available phenol resin | 100 parts | 100 parts |
| Macadamia nuts shell flour | 0 part | 10.0 parts |
| Radiata pine (Pinus radiata) outer bark powder (53 to 63 μm) | 10.0 parts | 0 part |
| Formaldehyde emission (mg/l) | 0.10 | 0.38 |

According to the present invention, mere crushing of a plant resource containing tannin and classification of fine particles having a certain particle size or less can give rise to powder with a high tannin content. Although it depends on the tannin content thereof, the obtained powder with a high tannin content, like the conventional tannin powder, can be used as an adhesive, binder, etc. or it can form moldings by itself. Therefore, the present invention has various advantages, for example, in that the steps of extraction, concentration, drying, etc. needed in the conventional production method for tannin are unnecessary.

What is claimed is:

1. A method for production of powder with a high tannin content, comprising:
    crushing wood bark of at least one of radiata pine (Pinus radiata) and Acacia mangium, and
    classifying the crushed wood bark to obtain particles having a particle size of 63 μm or less, wherein the obtained particles have a high tannin content of about 44% by weight or more and have a Stiasny value of about 97% or more.

2. The method according to claim 1, wherein the crushing is a mechanical pulverization.

3. The method according to claim 2, wherein the mechanical pulverization is performed with an apparatus comprising at least one of a hammer mill, a Wiley mill, a ball mill, a roller mill and a high speed rotary crusher.

4. The method according to claim 1, wherein the classification is performed with a classifier.

5. The method according to claim 4, wherein the classification of the particles is performed with at least one of a screen classifier comprising at least one of a rotary drum screen and a sieve shaker, and a dry classifier based on at least one of gravitational classification, inertial classification and centrifugal classification.

6. The method according to claim 1, wherein the wood bark is of radiata pine (Pinus radiata).

* * * * *